United States Patent [19]

Wagener et al.

[11] 3,994,792

[45] Nov. 30, 1976

[54] ELECTRODEPOSITION OF SULFOXONIUM STABILIZED COLLOIDS

[75] Inventors: Earl H. Wagener, Concord, Calif.; Dale S. Gibbs; Ritchie A. Wessling, both of Midland, Mich.

[73] Assignee: The Dow Chemical Company, Midland, Mich.

[22] Filed: Mar. 3, 1975

[21] Appl. No.: 554,382

Related U.S. Application Data

[63] Continuation-in-part of Ser. No. 392,701, Aug. 29, 1973, abandoned.

[52] U.S. Cl. ............................................. 204/181
[51] Int. Cl.² ........................................ C25D 13/06
[58] Field of Search .................................... 204/181

[56] References Cited
UNITED STATES PATENTS 3,501,432   3/1970   Wright et al. ........................ 204/181
3,645,872   2/1972   Weigel ................................ 204/181

*Primary Examiner*—Howard S. Williams
*Attorney, Agent, or Firm*—I. A. Murphy

[57] ABSTRACT

A method for electrodeposition of an organic material on an electroconductive surface comprising placing the electroconductive surface to be coated in contact with an aqueous dispersion containing a water-insoluble, essentially electrically non-conductive, film-forming, organic polymer as cation-active particles wherein a substantial portion of the cation-activity is provided by sulfoxonium cations and passing an electric current from an electrode through the latex to the electroconductive surface in such a direction that the electroconductive surface is negatively charged, i.e., becomes a cathode in an electrophoretic cell. By use of alternating current both electrodes become coated with an adherent coating of polymer.

11 Claims, No Drawings

ELECTRODEPOSITION OF SULFOXONIUM STABILIZED COLLOIDS

CROSS-REFERENCES TO RELATED APPLICATIONS

This application is a continuation-in-part of application Ser. No. 392,701, filed Aug. 29, 1973, now abandoned.

BACKGROUND OF THE INVENTION

1. Field of the Invention

The invention is concerned with electrodeposition of polymers in aqueous dispersion onto conductive surfaces wherein the article which comprises such surfaces is the cathode in an electric current carrying loop.

2. Description of the Prior Art

The usual procedure for coating of polymers, which are dispersed in aqueous media, onto articles has been carried out by making the article to be coated the anode. Most such anodic depositions employ the carboxyl as the functional group which assists in the transport of the polymer to the electrode. There previously has been some recognition that a cathodic electro-deposition system would be desirable. However, there are also problems with the known cationic systems. In general, especially with amine and ammonium type surfactants, the known cationic methods are carried out at low pH. Corrosion of metals becomes a problem at low pH. Such a method, for example, is shown in U.S. Pat. No. 3,159,558 in which the process is carried out at a pH of from about 2 to about 6. The cations, which provide the means of transport in most of the known cationic electrophoretic systems, remain with the polymer after deposition and continue to be points of moisture sensitivity. Furthermore, in the weak base systems the pH and the conductivity are interdependent and cannot be easily varied independently.

An improved process for cationic electrodeposition, in which cation-activity is provided by a sulfonium cation, is described in Applicants' copending application, Ser. No. 128,553, filed Mar. 26, 1971, "Cationic Electrodeposition of Polymers Onto a Conductive Surface", now abandoned, of which Ser. No. 587,472, filed June 16, 1975, is a continuation. Other new cationic electrodeposition processes are described in Applicants' two applications filed on Aug. 29, 1973: "Cathodic Electrodeposition of Polymers Onto a Conductive Surface" (application Ser. No. 392,699), now abandoned, of which Ser. No. 569,715, filed Apr. 21, 1975, is a continuation-in-part wherein cation-activity is provided by reducible, nitrogen-containing cations and "Electrodeposition of Isothiouronium Stabilized Lyophobic Colloids" (Application Ser. No. 392,700) now U.S. Pat. No. 3,882,009 wherein cation-activity is provided by isothiouronium cations.

SUMMARY OF THE INVENTION

In accordance with the present invention, there is provided a method of electrodeposition from aqueous dispersions of cation-active particles in an electrophoretic cell which comprises a coating bath and electrodes which constitute a cathode and at least one anode whereby an adherent, hydrophobic coating of polymer is applied to an object having an electroconductive surface by the steps of immersing the object to be coated into the coating bath comprising the aqueous dispersion of cationic particles, connecting a source of electric potential to the object to be coated as one electrode and to at least one other electrode in electrical contact with the coating bath, passing an electric current through the aqueous dispersion comprising the coating bath in such a direction that the electroconductive surface of the object to be coated becomes negatively charged and the other electrodes become positively charged. The aqueous dispersion comprising the cation-active polymer particles during the process has a conductance of from about 300 micromhos to about 3500 micromhos, preferably from about 600 to about 1800 micromhos, per centimeter and the polymer comprising the dispersed particles is a water-insoluble, essentially electrically non-conductive, film-forming organic polymer wherein a substantial portion, especially one-half or greater, of the cation-activity is provided by sulfoxonium cations.

Direct or alternating current may be used in the electrodeposition. Some of the hydrophilic character of the polymer due to the cationic groups is destroyed electrolytically during the deposition and at least most of the then remaining cationic groups may be destroyed by subsequent heating.

DESCRIPTION OF THE PREFERRED EMBODIMENTS

The practice of the present invention requires an electroconductive surface to be coated, a source of electric current, an electrode to function as an anode and an aqueous dispersion of a water-insoluble, essentially electrically non-conductive, film-forming, organic polymer as cation-active particles in which the cation activity is provided primarily by the action of sulfoxonium-containing cations.

A wide variety of aqueous dispersions of water-insoluble, essentially electrically non-conductive polymers are suitable for the practice of this invention.

Typically, such aqueous dispersions of the polymers are obtained by emulsion polymerization of one or more monomers. Ethylenically unsaturated monomers which are thus polymerized are represented by, but not restricted to, non-ionic monomers such as the alkenyl aromatic compounds, i.e., the styrene compounds; the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other polymerizable vinylidene compounds such as vinyl chloride and vinylidene fluoride. Specific examples of such ethylenically unsaturated compounds are styrene, α-methylstyrene, ar-methylstyrene, ar-ethylstyrene, α-ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl α-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene.

Such non-ionic monomers form water-insoluble homopolymers or water-insoluble copolymers when more than one of the group is used. However, there may be used as copolymerized constituents with the above kinds of monomers other monomers which as homopolymers would be water-soluble. The hydrophilic, water-soluble monomers are represented by hydroxyethyl acrylate, hydroxyethyl methacrylate, acrylamide, methacrylamide, N-methylol acrylamide, N-methylol methacrylamide and other modified acrylamides such as diacetone acrylamide, and diacetone methacrylamide.

Such monomers are not used in sufficiently large proportions as to make the copolymer water-soluble or significantly electrically conductive. The proportion of such somewhat hydrophilic, water-soluble monomers which may be copolymerized constituents of the polymers operable in the practice of this invention ordinarily ranges from 0 to about 30 percent or more based on the total weight of the copolymer.

The hydrophilic monomers are used in sufficiently small proportions that they do not interfere substantially with the cationic deposition process.

The method also advantageously is used with polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which are electrodeposited by the present invention are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid. The polymers, whatever their identity, are film-forming preferably at temperatures below about 25° C.

Methods for preparing the above described polymers are well known and are not a part of this invention.

It is required in the practice of the present invention that the polymers must be in the form of an aqueous dispersion of cation-active particles in which a substantial portion, such as one-half or greater, of the cation activity is provided by a sulfoxonium cation. Such cations may be attached to the polymer particles in various ways. For illustration, a surfactant comprising a sulfoxonium cation may be used in the preparation of the polymers by emulsion polymerization whereby the surfactant is adsorbed on the polymer particle. Alternatively, a latex can be prepared by emulsion polymerization using other emulsifiers then replacing at least a major proportion of the polymerization emulsifier in such latexes by removal of that emulsifier such as by dialysis or ion exchange methods and then substituting therefor a sulfoxonium surfactant. In still another procedure, preformed polymers, obtained for example by mass polymerization, are converted to aqueous dispersions with the aid of the same kind of surfactant such as by dissolving the polymer in a solvent, then thoroughly mixing the solution with water and the surfactant and subsequently removing the solvent to obtain a latex composition. Yet another procedure is to prepare a water-in-oil dispersion by adding a surfactant comprising a sulfoxonium cation to a preformed polymer, then slowly adding water to the water-in-oil dispersion with thorough mixing until inversion occurs to form an oil-in-water dispersion. The sulfoxonium cation also may become a part of the polymer by the copolymerization, with the other monomeric constituents of the polymer, of a monomer containing a sulfoxonium cation such as vinylbenzyldimethylsulfoxonium chloride.

Sulfoxonium surfactants, in common with all surfactants or emulsifiers, have a hydrophobic component and a hydrophilic component. The hydrophilic portion of a sulfoxonium surfactant is provided by the sulfoxonium group, i.e.

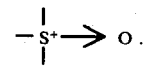

The identity of the hydrophobic portion is not critical. The present invention is concerned with the use of aqueous dispersions of polymers which are maintained in dispersion primarily with sulfoxonium cations in a cationic electrodeposition system. The sulfoxonium surfactants or emulsifiers are represented by water-soluble salts having the formula

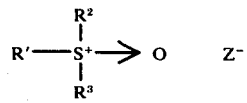

wherein R' is a long chain, monovalent hydrophobic radical having from 8 to 25 carbon atoms, $R^2$ and $R^3$ individually are organic radicals having from 1 to 8 carbon atoms but generally at least one of $R^2$ and $R^3$ has not more than 4 carbon atoms, often both of $R^2$ and $R^3$ have from 1 to 4 carbon atoms, with the proviso that the total number of carbon atoms in R', $R^2$ and $R^3$ ordinarily is not less than about 13 nor greater than about 30 and $Z^-$ is a water-soluble counteranion. Any of R', $R^2$ or $R^3$ may be a hydrocarbon radical or the chain length may be interrupted by oxygen, sulfur, nitrogen, phosphorus, or a keto, ester or amide linkage or a terminal group, such as hydroxy, keto, ester and amide, may be present. The hydrophobic radicals are not restricted to linear chains and may include aromatic components such as aralkyl.

In materials for use in the practice of the present invention, the counterion $Z^-$ is an electrolytically acceptable anion and is not necessarily water-soluble over the entire pH range, but should be water-soluble over the pH range which is being used in a particular electrodeposition. The counteranion, $Z^-$, is an anion which does not coagulate the dispersion and typically is the anion of an inorganic acid such as chloride, bromide, fluoride, nitrate, sulfate, bicarbonate, and phosphate; or an anion of an organic acid such as acetate, maleate, citrate, propionate, fumarate, acrylate, and benzoate, or hydroxide.

The sulfoxonium surfactants may be obtained, for example, by the process disclosed in U.S. Pat. No. 3,196,184, Jim S. Berry; which is incorporated herein by reference. That patent also illustrates operable surfactants for use in the practice of this invention. If it is desired to use sulfoxonium compounds having other anions than are possessed by the compound which is available, the desired anion can be substituted by simple ion exchange methods.

The sulfoxonium surfactants can also be obtained by oxidation of the appropriate sulfonium compound, such as by reaction of a sulfonium salt with hydrogen peroxide in an inert solvent at a temperature above 20° C. Suitable starting sulfonium compounds for this oxidation procedure are the surfactants described in U.S. Pat. Nos. 3,102,867, Emmett L. Buhle; 3,322,737, Donald A. Kangas; and 3,409,660, William G. Lloyd, the disclosures of each being incorporated herein by reference.

Sulfoxonium surfactants may be used in an emulsion polymerization process to prepare the latex products directly. Alternatively, a latex can be prepared by emulsion polymerization using small amounts of other emulsifiers then adding sufficient sulfoxonium surfactant so that it constitutes a substantial proportion of emulsifier in the latex or removing the polymerization emulsifier such as by dialysis or ion exchange methods and then substituting therefore a sulfoxonium surfactant.

The particle size of the aqueous dispersion or latex, however obtained, is not critical to the electrodeposition process. However, the particle size (average diameter) usually is in the range of from about 500 Angstroms to about 10,000 Angstroms, preferably from about 1,500 Angstroms to about 5,000 Angstroms.

The polymer particles have hydrophobic properties because of the nature of the polymer but have some hydrophilic character through positive charges, and hence some cationic character, because of the presence on the particle surface of sulfoxonium groups such as from adsorbed emulsifiers or from copolymerized monomers having sulfoxonium groups wherein the amount of such groups attached to the polymer is sufficient to provide water-dispersibility but is insufficient to impart water-solubility or electrical conductivity to the dry organic, film-forming polymer. Thus, the sulfoxonium groups are present on the polymer because of adsorbed surfactants containing the groups, because of copolymerization of monomers containing such groups, or because of conversion of other substituent groups on the polymer to sulfoxonium groups. The total quantity of cation-active groups usually ranges from about 0.02 milliequivalent to about 0.4 milliequivalent per gram of polymer. The sulfoxonium group, i.e., cation, has the formula

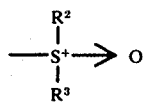

and the counterion is $Z^-$ where $R^2$, $R^3$ and $Z^-$ are as identified above for the sulfoxonium surfactants.

In this specification and the accompanying claims the term "cation-active particles" as applied to the polymer particles refers to particles according to the foregoing description.

The process of this invention is used to coat any electroconductive surface, i.e., articles having an electroconductive surface. Examples of materials which furnish electroconductive surfaces are metals such as iron, steel, phosphated steel, copper, aluminum, chromium, magnesium, tin, titanium, nickel, lead, zinc, or a metal alloy consisting of any of the aforesaid metals, conductive gels, conductive polymers and various forms of carbon such as graphite. Such materials can be in various forms or articles such as automobiles, wire, appliances, metal cans, siding, conductive paper and the like.

In the preferred embodiments of this invention a smooth, uniform, adherent, water insensitive coating is applied to the electroconductive surface.

The aqueous dispersions which are used in the electrocoating process are employed at a polymer concentration of from about 0.5 per cent to about 50 per cent by weight, preferably from about 2 per cent to about 15 per cent. For operability the process is essentially pH independent. For example, the process gives good electrodeposition performance with aqueous dispersions having a range of pH of from about 2 to about 12. Because of corrosion problems below a pH of 6, however, operation above a pH of 6 is preferred. Although operable in the process above a pH of 10, some sulfoxonium compounds decompose with time at such pH values. Therefore, a pH range of from about 6 to about 10 is especially preferred.

The aqueous dispersion, as formulated for the electrodeposition process, have a conductivity of from about 300 micromhos to about 3500 micromhos per centimeter, preferably from about 600 micromhos to about 1800 micromhos per centimeter, as measured at 25° C. and 10 percent solids.

In carrying out the electrodeposition process of this invention, an electrophoretic cell is utilized. In the process, the surface to be coated becomes a cathode, another electrode becomes an anode, the latex composition comprises the coating bath and a source of electric current is required. During the process, the article to be coated can be positioned and maintained so that the surface to be coated is stationary within the coating bath or can be passed through a coating bath in a continuous manner. With direct current, the source is connected to the electrodes so that the current flows in such a direction as to maintain the article to be coated as the cathode and the other electrode as the anode in an electrophoretic system. The anode and the cathode may each be a single member or either or both may constitute a plurality of joined members. If desired the anode may be separated by a diaphragm from the polymer dispersion. Thus, the anode per se is in electrical contact, but not necessarily physical contact, with the aqueous polymer dispersion. In the use of direct current the anode preferably should be inert for this cationic electrodeposition system and can be the tank in which the process is carried out, for example, if the tank is of metal which is graphite-coated on the interior surfaces. If alternating current is used, then the charge on the electrodes alternates between positive and negative and a particular electrode becomes coated during the periods when it is negatively charged. During the electrodeposition, the electromotive force is applied in various ways:

1. constant source voltage which results in decreasing current as the electrodeposition proceeds;
2. constant current flow which requires increasing voltage as the process occurs;
3. constant cathode potential, and
4. pulse, i.e., high voltages for short, intermittent times.

The electromotive force which may be applied in the present process covers a wide range such as from about 10 volts to about 5,000 volts. With the first three of the above-listed methods of application, the applied potential generally is not greater than about 350 volts. With the fourth method of application, the potential used ranges from about 200 to about 5,000 volts, preferably to about 800 volts.

The coating bath conveniently is operated at ambient temperature, preferably from about 20° to about 35° C. although temperatures from about 0° to about 70° or 80° C. may be used.

In prior known electrocoating processes using aqueous dispersions of film-forming, organic polymers, supporting electrolytes ordinarily are not used. The presence of extraneous electrolyte is known to have a deleterious effect on such processes. However, to obtain optimum results in the practice of the present invention, certain types of water soluble inorganic salts are used to control conductivity. The salt concentration can affect film thickness, quantity of electricity used, efficiency (milligrams of coating deposited per coulomb), and appearance of the coating. Various kinds of salts may be used as supporting electrolytes. The anions of such salts may be selected from the same kinds which are suitable as the counterion for the sulfoxonium cation required for the process. The cations of the supporting electrolyte salts should be selected so as not to interfere with the electrodeposition of the resin at the cathode. Undesirable cations include the alkali metal ions and calcium ions, which can be tolerated, however, at low concentrations, i.e., less than about 0.002 normal. In general, such undesirable ions have electrode potentials more negative than −2.40 volts as defined at pages 414 and 415, with values being listed from page 415 through page 426, of *The Encyclopedia of Electrochemistry*, Clifford A. Hampel, Editor, Reinhold Publishing Corporation, New York, 1964.

In the present process, a supporting electrolyte assists in some embodiments of the invention to improve efficiency, particularly at low emulsifier concentrations. The addition of supporting electrolyte increases throwing power at constant pH. Such supporting electrolytes are water-soluble and may be used in small amounts such as up to about 0.1 normal based on the total volume of the aqueous dispersion of the coating bath. However, the amount used should not be sufficient to raise the conductivity of the aqueous dispersion above about 3500 micromhos per centimeter. Ammonium salts of weak acids, such as ammonium acetate, ammonium borate, ammonium carbonate, ammonium bicarbonate, and ammonium maleate, are preferred. Diammonium hydrogen phosphate has been found to be especially effective. In addition to their conductive contribution, the preferred salts also serve to buffer the aqueous medium and in general to assist in the deposition of smooth, adherent films.

The coating bath comprises the aqueous dispersion of polymer including the sulfoxonium surfactant and various optional additives. Such additives include, for illustration, pH control agents, buffers and supporting electrolytes as referred to above and also such materials as dyes, pigments, fillers, agents for improved flow, and standard plasticizers and/or crosslinking systems for the particular polymer being electrodeposited.

When the conducting surface of the article to be coated is maintained stationary in the coating bath, the flow of current stops, or becomes very low, when the article is coated. In such a process, the polymer coating ordinarily is deposited on the electroconductive surface within from about 10 seconds to about 2 minutes, although under the extremes of conditions, the deposition can be accomplished in one second or less. In the preferred embodiments, deposition occurs with rapid current cut off and is complete in less than 2 minutes. In electrodeposition processes in which the surface to be coated is passed through the coating bath in a continuous manner, such as in wire coating, the current does not cut off. During the electrodeposition process, it is advantageous that the coating bath should be circulated continuously.

The thickness of the film which is electrodeposited ranges from about 0.1 mil to about 2 mils depending on the conductive substrate, the polymer composition, the soap concentration, the type of inorganic salt, the inorganic salt concentration, the applied voltage, the current density, the pH, the temperature of the coating bath, the deposition time and solids concentration in the coating bath. The film, as deposited, is very hyrophobic and is firmly adhered to the conductive substrate. In usual practice, the coated article is rinsed by a stream or spray of deionized water. Such treatment does not swell, soften or dislodge the electrodeposited film.

The present invention provides an electrodeposition system which has excellent throwing power. By "throwing power" is meant that property whereby areas of the electrode being coated at varying distances from the other electrode receive substantially the same density and thickness of the coating material when coated at the same potential. Throwing power relates to the ability to coat hidden areas on irregular shaped objects. There are several methods for measuring throwing power. To obtain the results shown in the examples of this specification, a tank made of Plexiglas having a depth (inside) of 10 cm. was used which, viewed from the top, is L-shaped. The base of the L has a width of 3 cm. and the other arm of the L has a width of 1.5 cm. (all inside measurements) with no internal division between them. In the base of the L, two 4 inch square (10 × 10 cm.) panels are disposed opposite each other and parallel to each other and to the base of the L. One panel is a carbon plate and functions as a reference electrode, i.e., the anode. The other panel is phosphatized steel (Bonderite 37) and functions as the cathode. The other arm of the L is the throwing power section and contains a phosphatized steel panel, 4 inches × 12 inches (10 × 30 cm.), which is connected by a shunt to the cathode in the base of the L. In carrying out a test, the tank is filled to a depth of about 9 cm. with the coating composition dispersion so that approximately three-quarters of each panel is immersed in the dispersion and a source of the desired voltage is connected to the anode and cathode in the base of the L for 2 minutes (unless otherwise specified). The throwing power in percentage is recorded according to the percentage of the long dimension of the 4-inch by 12-inch panel which is coated, i.e., $\frac{\text{coated distance, inches (or cm.)}}{12 \text{ inches (or 30 cm.)}} \times 100\%$.

This apparatus, with one significant difference, is the same as that described by A. E. Gilchrist and D. O. Shuster at page 195 and illustrated in FIG. 1 in *Electrodeposition of Coatings*, Advances in Chemistry Series, No. 119, American Chemical Society (1973) (Library of Congress Card No. 73-75713). The difference is that the polarity is reversed on the electrodes since Gilchrist and Shuster were measuring anodic electrodeposition whereas the present invention is concerned with cathodic electrodeposition.

In order to be acceptable, the throwing power should be at least 25 per cent and preferably should be greater than about 40 per cent.

Throughout this specification, all references to values for conductivity are values as measured at 25° C. unless specifically indicated otherwise.

The following examples show ways in which the present invention can be practiced, but should not be construed as limiting the invention. All parts are parts by weight and all percentages are weight percentages, unless otherwise expressly indicated.

EXAMPLES 1–7

Preparation of the Surfactant

Dimethyldodecylsulfoxonium chloride was prepared substantially according to the method of British Pat. No. 1,191,898 from dimethyldodecylsulfonium methyl sulfate. A 30 per cent aqueous solution of 100 grams of dimethyldodecylsulfonium methyl sulfate was ion exchanged to the chloride form with an ion exchange resin. To that solution was added 0.5 moles of 30 per cent hydrogen peroxide and the resulting solution was heated for 10 hours at a temperature ranging from 35°–40° C.

Preparation of Coating Formulation

A latex, having a particle size of 1370 Angstroms and containing a copolymer of 40 weight per cent of styrene and 60 weight per cent of butyl acrylate which had been prepared by emulsion polymerization using as surfactant dimethyldodecylsulfoxonium chloride obtained as described above, was dialyzed to remove extraneous salts then additional surfactant of the same kind was added to provide a total of 0.06 milliequivalent of surfactant per gram of polymer in the latex. The resulting latex composition was diluted to a solids content of 10 per cent, the pH was adjusted to 6.5 and the conductivity to 965 micromhos per centimeter by addition of diammonium hydrogen phosphate.

Electrodeposition of the Coating Formulation

The above-described formulation was used to coat various metal panels by cathodic electrodeposition as summarized in Table I. For each series a rectangular polyethylene electrodeposition cell containing two graphite anodes of equal size located at the ends of the long axis was partially filled with the latex. A rectangular sample, about ½ inch by 4 inches by 1/16 inch, of the indicated metal was immersed in the latex to a depth sufficient to provide 729 square millimeters of metal surface in contact with the latex halfway between the two anodes with the flat ½ inch by 4 inch plane normal to a straight line between the two anodes. A source of direct current at the indicated potential was connected individually to the two anodes and to each of the samples which functioned as the cathode. After 2 minutes, the residual current was measured, the potential source was disconnected and the sample was rinsed in a stream of deionized water. The coating remained firmly adhered to the metal. After drying, the coating weight and efficiency were determined. The test results are shown in Table I.

The throwing power at 200 volts, determined according to the method described supra, was found to be 85 per cent for Example 1.

TABLE I

| Example No. | Metal | Dodecyldimethylsulfoxonium Chloride No. of Panel Tested | Volts | Time Min. | Coating Wt. mg. | Coul. | Efficiency mg/Coul. |
| --- | --- | --- | --- | --- | --- | --- | --- |
| 1 | PCS[a] | 3 | 200 | 2.0 | 13 | 0.52 | 25.2 |
| 2 | CRS[b] | 2 | 200 | 2.0 | 21.3 | 0.86 | 24.8 |
| 3 | Copper | 3 | 200 | 2.0 | 41.8 | 0.90 | 45.6 |
| 4 | Lead | 3 | 200 | 2.0 | 19.9 | 0.77 | 26.0 |
| 5 | Platinum | 1 | 200 | 2.0 | 28.9 | 1.16 | 25.0 |
| 6 | Magnesium | 3 | 200 | 2.0 | 242 | 6.4 | 37.8 |
| 7 | Aluminum | 3 | 200 | 2.0 | 16.1 | 0.62 | 26.0 |

[a]PCS = Phosphated Steel (BONDERITE 37)
[b]CRS = Cold Rolled Steel

EXAMPLES 8–10

To a latex of a copolymer of 60 weight percent of styrene and 40 weight percent of butadiene having a particle size of 1480 Angstroms and containing 0.03 milliequivalent of dodecylbenzyldimethylsulfonium chloride was added 0.17 milliequivalent of dimethyldodecylsulfoxonium chloride which was prepared as described for Examples 1–7. Sufficient diammonium hydrogen phosphate to raise the conductivity to 2480 micromhos per centimeter and sufficient water to dilute the solids content of the latex to 10 per cent were then added and the pH was adjusted to 7.5. Panels of phosphated steel (PCS) and cold rolled steel (CRS) were coated as described for Examples 1–7, except that larger panels were immersed in the latex to a depth sufficient to provide about 9500 square millimeters of surface, rather than 729, and the voltages and times are as shown in Table II. After coating, the panels were removed from the bath, rinsed in a stream of deionized water and then were baked in an oven at 175° C. for 20 minutes. During the water rinse, the coating remained firmly adhered to the metal.

The coating weights, coulombs, efficiencies and thicknesses shown in Table II are an average of three panels.

TABLE II

Dodecyldimethylsulfoxonium Chloride and Dodecylbenzyldimethylsulfonium Chloride

| Example No. | Metal[a] | Volts | Time Sec. | Coating Weight mg. | Coul. | Efficiency mg/Coul. | Thickness mils |
|---|---|---|---|---|---|---|---|
| 8 | PCS | 100 | 30 | 101.9 | 11.8 | 8.6 | 0.2 |
| 9 | PCS | 200 | 30 | 224.6 | 10.7 | 21.0 | 0.65 |
| 10 | CRS | 100 | 30 | 21.5 | 16.8 | 1.3 | 0.07 |

[a]PCS = Phosphated Steel (BONDERITE 37)
CRS = Cold Rolled Steel

EXAMPLES 11–13

Additional panels were coated as described for Examples 8–10 except for the following changes: (a) the copolymer in the latex contained 50 weight percent of styrene and 50 weight percent of butadiene, (b) the conductivity and pH were adjusted to the values shown in Table III using diammonium hydrogen phosphate and ammonium hydroxide, (c) the panels were zinc phosphated steel, and (d) the electrodeposition was for 30 seconds at 200 volts.

The current cut off rapidly in all examples. The resulting coatings continued to be firmly adhered to the panels when they were rinsed with deionized water. The pH, conductivities, efficiencies and thicknesses are shown in Table III.

TABLE III

| Example No. | pH | Conductivity micromohos/cm | Efficiency mg/Coul. | Thickness mils |
|---|---|---|---|---|
| 11 | 3.3 | 1400 | 20.5 | 0.40 |
| 12 | 7.5 | 1400 | 8.8 | 0.13 |
| 13 | 9.7 | 1430 | 15.8 | 0.32 |

EXAMPLE 14

To a latex of a copolymer of 60 weight percent of styrene and 40 weight percent of butadiene having a particle size of 1480 Angstroms and containing 0.03 milliequivalent of dodecylbenzyldimethylsulfonium chloride was added 0.17 milliequivalent of dodecyl-bis-(2-hydroxyethyl)sulfonium acetate. The solids content of the latex was reduced to 10 per cent by dilution with water, the pH was adjusted to 7.5 and the conductivity was raised to 2300 micromhos per centimeter by the addition of diammonium hydrogen phosphate. For comparative purposes and not as an example of this invention, that formulated latex (Comparative Material C-1) was used in the electrodeposition procedure described in Examples 1–7 except that the larger panels were used as in Examples 8–10. The data are shown in Table IV.

Another portion of the formulated latex was treated with 7 milliequivalents of hydrogen peroxide per milliequivalent of surfactant [dodecylbenzyldimethylsulfonium chloride and decyl-bis-(2-hydroxyethyl)sulfonium acetate] for about 18 hours at 30° C. to convert sulfonium groups to sulfoxonium groups. Electrodeposition of the resulting latex (an example of the present invention) was carried out in the same manner as with the comparative material. The electrodeposition data on the hydrogen peroxide treated formulation also are shown in Table IV. In each of Comparative Materials C-1 and the example of the invention, the panels were rinsed with deionized water before baking and the coatings remained firmly adhered.

TABLE IV

| | Latex C-1 | Latex 14 |
|---|---|---|
| Conductivity, micromhos/cm | 2300 | — |
| Voltage | 200 | 200 |
| Coating time, seconds | 30 | 30 |
| Metal Type | PCS | PCS |
| Thickness, Mils | 0.3 | 1.2 |
| Efficiency, Mg/Coul. | 6.9 | 13.7 |
| Appearance after baking | Smooth, uniform | Smooth, uniform |

In substantially the same manner, other latexes stabilized with dodecylbenzyldimethylsulfonium chloride were treated with various levels of hydrogen peroxide from 0.5 milliequivalent to 7.5 milliequivalents per milliequivalent of the sulfonium chloride surfactant to oxidize sulfonium groups to sulfoxonium groups. These treated latexes were formulated so that their conductivities were less than 3500 micromhos per centimeter and were successfully electrodeposited to provide thin, hydrophobic coatings on various metal panels.

It was also observed that the hydrogen peroxide treatment reduced the odor of the latexes.

Similarly it was observed that the formulated latex used for the electrodeposition in Examples 8–10 had lower odor than an identical latex except that instead of the dimethyldodecylsulfoxonium chloride, the same number of milliequivalents of dodecylbenzyldimethylsulfonium chloride was added.

EXAMPLES 15–16

A latex of a copolymer of 60 per cent of butyl acrylate and 40 per cent of styrene having a solids content of 38.5 per cent and containing 0.2 milliequivalent of dodecylbenzyldimethylsulfonium chloride per gram of polymer was reacted at 30° C. for 20 hours with 1.4 milliequivalents of hydrogen peroxide per gram of polymer. The resulting product (Latex Y) was a stable latex having a conductivity of less than 1500 micromhos per centimeter.

To three separate portions of Latex Y were added, respectively, sufficient diammonium hydrogen phosphate to raise the conductivity to 1500 micromhos per centimeter (Example 15), 3500 micromhos per centimeter (Example 16) and 17000 micromhos per centimeter (Comparative Material C-2 — not an example of the invention). For each of the above portions, the solids content was reduced to 10 per cent by the addition of water and the pH was adjusted to 7.5. The resulting latexes were electrodeposited on zinc phosphated steel substantially as described in Example 14 except that the samples were divided and two different voltages were used, i.e., 60 volts (A) and 150 volts (B), rather than a single electrodeposition at 200 volts. Data are shown in Table V.

TABLE V

| Example No. | Conductivity Micromhos/cm. | Voltage | Maximum Current Amp/dm² | Residual Current Milliamp. | Coating Weight mg. | Coating Thickness mils |
|---|---|---|---|---|---|---|
| 15-A | 1500 | 60 | 3.5 | 100 | 136.6 | 0.63 |
| 15-B | 1500 | 150 | 7.0 | 100 | 26.0 | <0.1 |
| 16-A | 3500 | 60 | 7.0 | 100 | 72.5 | 0.4 |
| 16-B | 3500 | 150 | 10.5 | 50 | 78.8 | 0.28 |
| C-2A | 17000 | 60 | 19 | 350 | 24.2 | 0.10 |
| C-2B | 17000 | 150 | >25 | 4000<sup>a</sup> | 94.0 | 0.22 |

<sup>a</sup>terminated at 17 seconds.

For all the examples of the invention, i.e., the first four examples in Table V, no gassing could be observed, there was no noticeable heat-up of the bath and there was no evidence of coating rupture during the process. Thin, smooth, uniform clear coatings having no discoloration were obtained in all these examples of the invention and these coatings continued to be firmly bonded to the panels during a rinse with deionized water.

For Comparative Materials (C-2A and C-2B, considerable heat-up of the bath occurred. For C-2B, rather than an electrodeposition time of 30 seconds as in the other tests, the passage of current was stopped at 17 seconds because of smoking and boiling of the bath. For each of C-2A and C-2B there was severe gassing and coating rupture during the process and the resulting coated panels was black. When these panels were rinsed with deionized water, excessive and uneven wash-off occurred. Even after baking the coatings were rough and pockmarked.

While latexes 15 and 16 are stable with passage of long periods of time, Comparative Material C-2 was completely coagulated within 24 hours.

That which is claimed is:

1. A process for applying an adherent, hydrophobic coating to an object having an electroconductive surface comprising
   1. immersing the object in a coating bath comprising an aqueous dispersion having a pH in the range from about 2 to about 12 of cation-active particles of water-insoluble, essentially electrically non-conductive, organic, film-forming polymer wherein a substantial portion of the cation-activity is provided by sulfoxonium cations; said aqueous dispersion having a conductivity of from about 300 micromhos to about 3,500 micromhos per centimeter;
   2. passing an electric current through said bath sufficient to effect deposition of a coating of said polymer on the object by providing a difference of electrical potential between the object and an electrode that is
   a. spaced apart from said object
   b. in electrical contact with said bath
   c. electrically positive in relation to said object, said coating which is deposited continuing to be adherent in the presence of water after the difference of electrical potential is discontinued.

2. The process of claim 1 in which the electric current is direct current.

3. The process of claim 1 in which the aqueous dispersion has a solids content of from about 2 per cent to about 15 per cent by weight.

4. The process of claim 1 in which the dispersion is maintained at a pH of from about 6 to about 10.

5. The process of claim 1 in which the conductivity of the aqueous dispersion is from about 600 micromhos to about 1,800 micromhos per centimeter.

6. The process of claim 1 in which the aqueous dispersion contains a supporting electrolyte.

7. The process of claim 1 in which some of the cation-activity is provided by sulfonium cations.

8. The process of claim 1 in which the sulfoxonium cation has the formula

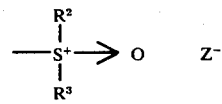

wherein $R^2$ and $R^3$ individually are organic radicals having from 1 to 8 carbon atoms and $Z^-$ is a water-soluble, electrolytically acceptable anion.

9. The process of claim 8 in which the organic radicals $R^2$ and $R^3$ individually have from 1 to 4 carbon atoms.

10. The process of claim 1 in which the sulfoxonium cation is provided by an adsorbed sulfoxonium compound.

11. The process of claim 10 in which the sulfoxonium compound has the formula

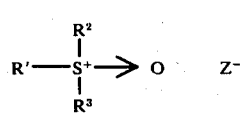

wherein $R'$ is a long chain, monovalent, hydrophobic radical having from 8 to 25 carbon atoms, $R^2$ and $R^3$ individually are organic radicals having from 1 to 8 carbon atoms and $Z^-$ is a water-soluble, electrolytically acceptable anion; with the proviso that the total number of carbon atoms in $R'$, $R^2$ and $R^3$ is from 13 to 30.

* * * * *